Oct. 28, 1969    F. B. KIESER    3,474,579
REELABLE STRUCTURE
Filed Nov. 30, 1967    2 Sheets-Sheet 1
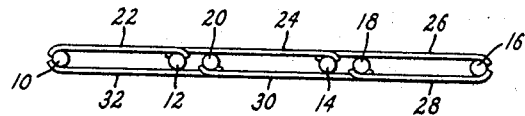
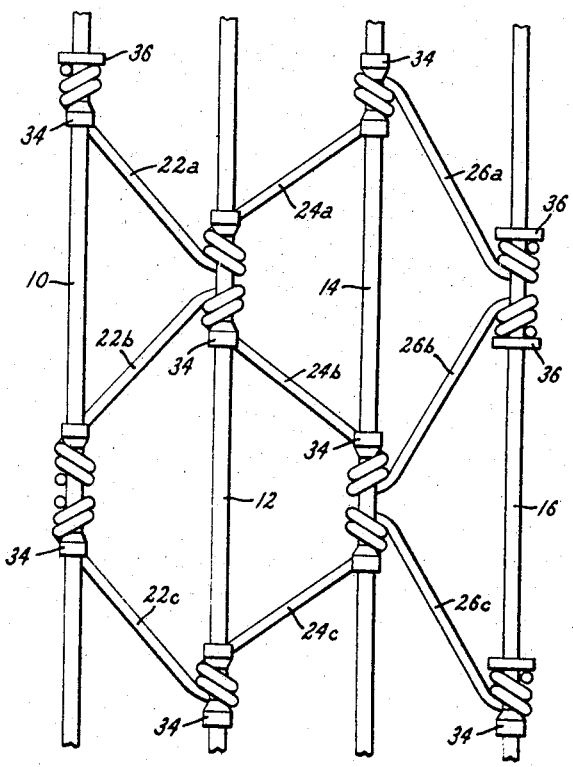
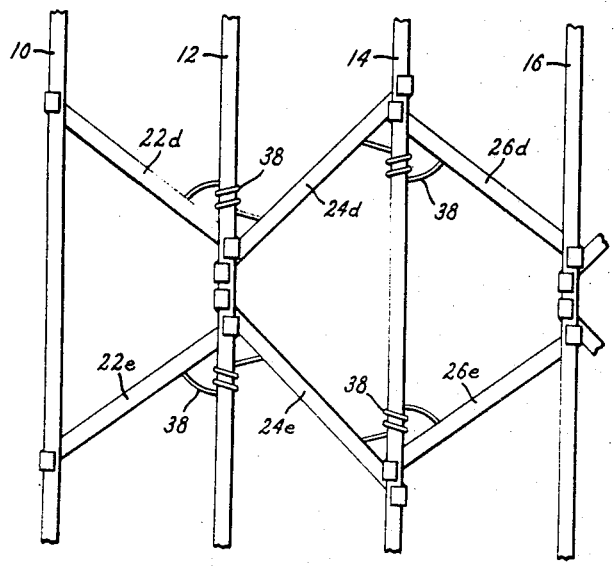
INVENTOR:
FRANK B. KIESER,
BY Henry W. Kaufmann
AGENT Oct. 28, 1969  F. B. KIESER  3,474,579
REELABLE STRUCTURE
Filed Nov. 30, 1967
2 Sheets-Sheet 2
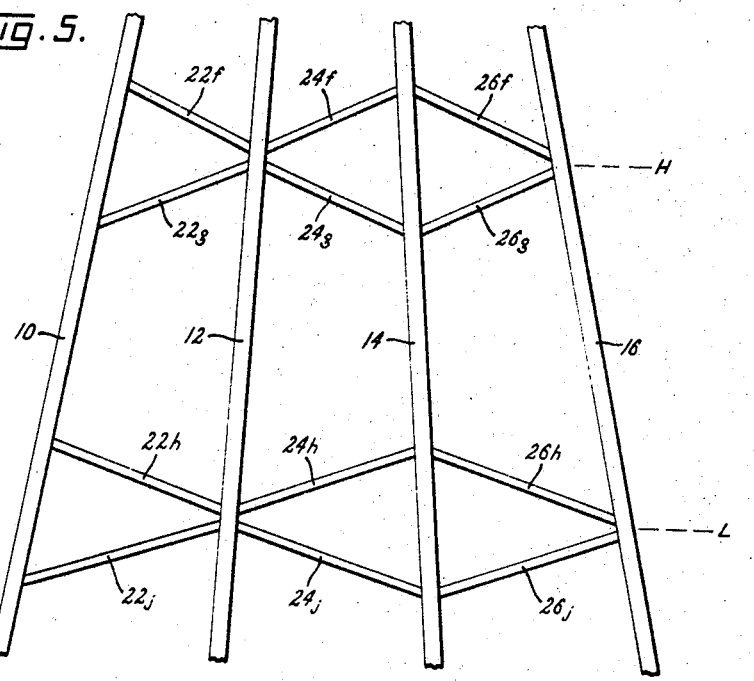
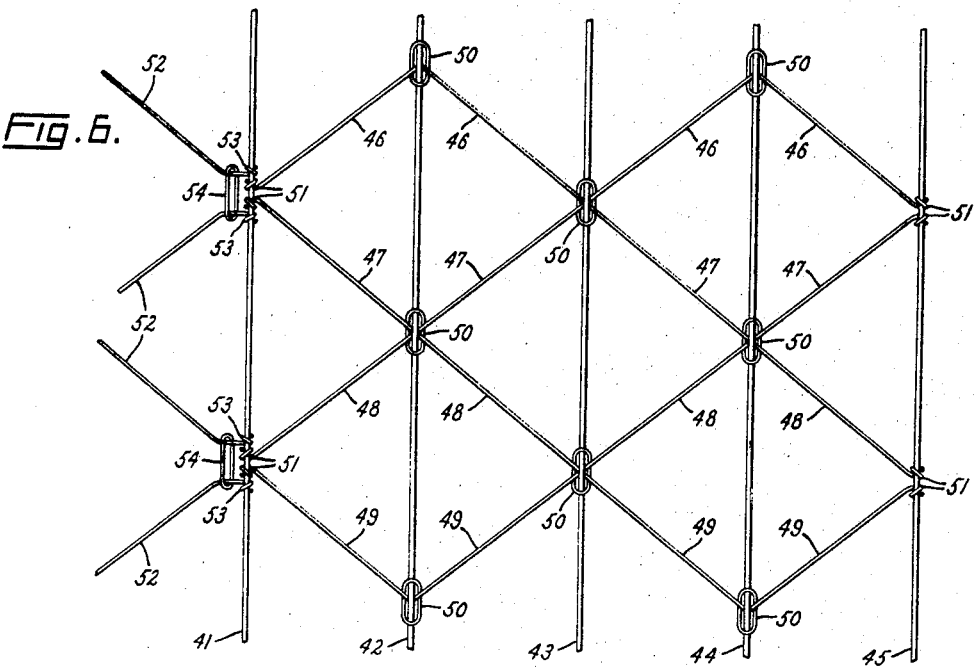
INVENTOR:
FRANK B. KIESER, United States Patent Office 3,474,579
Patented Oct. 28, 1969

3,474,579
REELABLE STRUCTURE
Frank B. Kieser, Berwyn, Pa., assignor to General Electric Company, a corporation of New York
Filed Nov. 30, 1967, Ser. No. 687,047
Int. Cl. E04h 12/18
U.S. Cl. 52—108                    6 Claims

ABSTRACT OF THE DISCLOSURE

Reelable self-erecting tower is formed of flexible side rods tied together by spring-hinged cross braces; side rods are displaced with respect to each other in reeling and lie parallel without cross braces being crushed.

---

This invention pertains to tower structures, and more particularly to such structures which are readily erected and collapsed.

There are numerous uses for readily erectable and collapsible towers; meteorological instrumentation, display of signals, support of antennae are uses which come readily to mind. A use less well known is that of furnishing orienting torques to a space vehicle by extending through a gravitational field of varying intensity. In the older uses, towers are ordinarily made erectable and removable by linking together rigid sections either by pinning or otherwise fastening completely separated sections or by fastening in position sections hinged to each other. Such sections are often made with three or four side rods tied together by angle braces, the open structure resulting having high section modulus and moment of inertia but low wind resistance. In space use, it has been customary to provide extended members by unreeling a strip of flexible material, usually metal, which is curved to form a long narrow tube. It is a defect of such a tubular structure that the side exposed to the sun's radiation is heated more than the other side which is in darkness; and the resulting differential expansion causes the tube to bend. This effect may be minimized, but not eliminated, by coating the tube with a highly reflective coating which reduces the absorption of solar radiation. Another disadvantage of such a tubular structure is that relative motion of the overlapping edges can occur, permitting comparatively easy bending of the extended tubular structure; various means have been suggested in the prior art for locking the edges of the tubular strip together, but this involves some special precautions in the unreeling process or device to insure that locking actually occurs.

I have invented a reelable self-erecting tower structure which is self-erecting when unreeled and shows a useful degree of strength and rigidity which not only permits it to be used for space use, but also permits it to be used in ordinary terrestrial applications as a readily erectable and collapsible mast for such purposes as carrying radio antennas. In space use, it has the advantage that all linear parts are equally heated and so expand equally, without causing bending; and when used on the ground it has the advantage that it may be erected by simple unreeling from a compact storage reel, not requiring the effort or time required to assemble separate rigid lengths of conventional tower structure.

My invention employs a plurality of at least four rods tied together by spacers or braces. The side rods are individually flexible so that they may be reeled up when they are not braced against bending by other side rods. This situation of easy bending of the rods will occur generally when the axes of all the rods are approximately coplanar, so that the moment of inertia of n rods is simply n times that of one rod, and the torque required to roll n rods is merely n times that required to roll one rod. In the absence of braces or spacers between the rods, they would bend just as easily if they were not coplanar, for example, if they were arranged with circular symmetry around a central axis. But, if the ends of rods arranged symmetrically around a center are fastened to a base (as is normal in the use of tower structures), then in order to bend the rods must move axially with respect to one another, which does not occur if they are coplanar. The spacers I provide are arranged to prevent such axial movement of one rod with respect to another, and to prevent change in the angle between the axis of one rod and another when the rods are arranged about a center, or otherwise non-coplanar. In order to achieve collapsibility by permitting the rods to be made coplanar, the spacers are effectively hinged, either literally or effectively through being compliant. A structure of such rods and spacers which was freely hinged could be made rigid by being unfolded so that the rods were noncoplanar; but a mere touch could render the rods coplanar and permit the whole structure to collapse. I have found that it is practical to incorporate, in the combination of the spacers and the means which fasten the spacers to the rods, compliance means (which may inhere in the compliance of the spacers themselves or may be springs constituting part of the fastening means) which will tend to maintain the rods non-coplanar, but can be caused by the appliance of moderate force to yield and permit the rods to become coplanar so the structure may be collapsed and rolled up. These compliance means provide the self-erecting and sustaining feature which is one of the benefits of my invention.

Thus I achieve generally the object of providing a tower of components sufficiently flexible to be reeled or rolled up and yet one which has the strength and stiffness properties, when erected, of a more conventional tower of truss structure; and by the achievement of this object, I achieve various other advantages (depending upon the application) of minimizing thermal bending, providing rapid and easy erection, permitting compact storage and ready transportation, and others which will be evident to those skilled in the art.

For the better explanation and understanding of my invention I have provided figures of drawing in which:

FIG. 1 represents a view of an embodiment of my invention folded flat for rolling;

FIG. 2 represents a view of the embodiment of FIG. 1 erected;

FIG. 3 represents details of an embodiment of my invention in which the spacers are elastic and furnish compliance;

FIG. 4 represents details of an embodiment of my invention in which the spacers are hinged loosely to rotate, and are provided with separate compliance means;

FIG. 5 represents part of an embodiment of my invention in which the erected structure will be tapered;

FIG. 6 represents details of a specific embodiment of my invention.

Referring first to FIG. 1, it is observed that rods 10, 12, 14, 16, 18, and 20 are spaced cyclically from each other by spacers 22, 24, 26, 28, 30, and 32. The spacers which are opposite each other and are attached to the edge rods 10 and 16 are of different lengths in order that intermediate rods 12 and 20, and 14 and 18, may lie beside each other in order that their axes may be coplanar. Thus spacer 22 differs in length from spacer 32, and 26 differs from 28, although spacers lying between two intermediate rods, such as 24, may be equal in span with their opposites such as 30. The sum of the spacings produced collectively by spacers 22, 24, and 26 must be equal to the sum of the spacings produced collectively by spacers 28, 30, and 32 in order that the structure may collapse flat, with the rod axes coplanar, in order to be readily rollable.

FIG. 2 represents the same embodiment as FIG. 1 when released and allowed to erect itself. The compliances which are operative to tend to cause intermediate rods 12 and 14 and 18 and 20 to become non-coplanar with the rods adjacent to them have done so, producing the erected structure of appearance (viewed from an end) of FIGURE 2. It should be observed that compliances are preferably not operative around the edge rods 10 and 16, since the angular rotation which spacers, e.g., 22 and 32 must undergo relative to each other to achieve the format of FIG. 1 is quite large, and provision of a restraining compliance at this point would tend, in general, to produce a strong torque resisting collapse.

FIG. 3 represents details of one way of providing spacers which are themselves the source of the desired compliance. The topmost line of spacers 22, 24, and 26 (designated as 22a, 24, and 26a) is represented as formed of linear elements such as a flexible steel wire which is wrapped around rods 10, 12, 14, and 16 to form one continuum constituting the spacers identified. The spiral wraps around the rod tend to maintain the spacer fixed in angular orientation with respect to the axis of the rod, although it can rotate around the axis. The spacers are fixed in position along the axes of the rods by the tapered-ended washers 34 and flat washers which may be welded or pinned to the rods. The permanent set given to the wire in the wrapping process may provide the compliance opposing coplanarity of the rod axes. It will be observed that the continuity of the spacers ends at the edge rods 10 and 16, since it is not desired (as has been explained above) that there be torques about the edge rods. Similarly, spacers with b postscript form another continuum, and those with c a third.

FIG. 4 represents a mode of providing spacers which have separate provision for compliance. In this case, spacers designated with a d postcript (22d, 24d, and 26d) are separate strips of metal formed into loops around rods 10 and 12, 12 and 14, and 14 and 16, respectively. Thus they are fixed in angle with respect to the rod axes. Coil springs 38 are wrapped around the intermediate rods and their ends are extended to press against the respective spacers so that they constitute compliance means tending to keep adjacent rods non-coplanar. They may be wrapped tightly enough so that they serve like clips to maintain the spacers fixed in axial position along the rods; or alternatively washers may be pinned or welded on the rods as shown by FIG. 3.

FIG. 5 represents a possibility which may be of use for specialized requirements. It represents an embodiment in which rods 10, 12, 14, and 16 are spaced at altitude H by spacers 22f, 24f, 26f, and 22g, 24g, and 26g; and at altitude L, the same rods are spaced by spacers 22h, 24h, 26h, and 22j, 24j, and 26j. The spacers at altitude H are shorter than those at altitude L, producing a tapered structure.

It is apparent that generally it will be desirable to construct embodiments of my invention so that the rods lie on a circle, and are nearly equally spaced around it with only such deviation from equal spacing as is necessary for the rods to lie coplanar when the structure is collapsed. For use as a gravity-gradient device, the structure should have sufficiently few rods so that there will be very little probability that one rod will be shadowed by another. As has been explained, my structure when so designed has the advantage for use in gravity-gradient stabilization that when all the rods are exposed equally to solar radiation they will all expand equally, and the structure will not tend to bend from unequal expansion. The open type of structure produced by this general design also has the advantage of offering comparatively low wind resistance for ordinary terrestrial tower uses. However, there is no basic reason why the structure should be an open one. If, for example, it were desired to provide a hollow structure which could be camouflaged to resemble, e.g., a tree trunk, the spacers could be simple panels of thin metal sheet crimped like butt hinges around the rods, somewhat similarly to the embodiment of FIG. 4. The length of each crimp would have to be sufficiently short to permit rolling of the structure; and, in any event, the crimps would have to be interrupted to permit insertion of crimps from the opposite spacer, producing a structure very much like the alternating crimps of a standard rolled butt hinge. Such an embodiment would erect to form a kind of hollow tube which might be used for support or as a rapidly erectable ventilating shaft, or many other purposes.

A specific example, with dimensions, of an embodiment of my invention, was built as follows:

Eight rods of 1/32" diameter commercial music wire were spaced as follows, rods being numbered in sequence.

| Rod Number | 1 (edge) to 2 | 2 to 3 | 3 to 4 | 4 to 5 (edge) |
| --- | --- | --- | --- | --- |
| Spacing, inches | 1 3/8 | 1 1/4 | 1 1/4 | 1 1/4 |
| Rod Number | 5 (edge) to 6 | 6 to 7 | 7 to 8 | 8 to 1 (edge) |
| Spacing, inches | 1 3/8 | 1 1/4 | 1 1/4 | 1 1/4 |

It will be noted that the spacing from each edge rod (1 and 5) to the next rod succeeding it in the sequence is 1/8 inch greater than the 1 1/4 inch spacing between other rods. This assures that, when the array is folded flat for rolling, all the rods can be made coplanar.

Spacers were formed of 0.025 inch diameter commercial music wire, which were fastened to each intermediate rod by small wire clips which were lightly brazed to the rod and to the spacer.

FIG. 6 represents a view of the first five rods in sequence, laid flat and viewed from the inside of the structure—that is, as it would be seen by one looking through the remaining rods of the sequence. The rods which are 1, 2, 3, 4, and 5 in the sequence are identified respectively as 41, 42, 43, 44, and 45. The spacers described as being of 0.025 inch music wire are numbered 46, 47, 48, and 49. They pass simply behind each intermediate rod (42, 43, 44) and are held axially in place and are fixed in angle with respect to the axis of the rod by clips or loops 50 which are brazed to the rod and to the spacer, the brazing not being shown since it would destroy the detail of the loops. The spacers are terminated at edge rods 41 and 45 by simple loops 51 which form a kind of hinge joint between the edge rod and the spacer. The spacers do not extend past an edge rod because this would operate against the pivoting which occurs when the structure is folded flat for rolling.

Portions of the spacers 52 extending from the eighth rod in the sequence (not shown) to rod 41, the first in the closed sequence of rods, illustrate the means for fastening the spacers 46, 47, 48, and 49. Portions 52 terminate at rod 41 in loops 53, similar to loops 51 but located on either side of loops 51. Pairs of loops 53 are held by clips 54, which urge them toward each other and against the loops 51 which they surround. Clips 54 are lightly brazed in place to spacers 52. Spacers 52 extend from the fifth rod in the sequence (45) along the sixth, seventh, and eighth rods (not represented) to the first rod (41) in exactly the same fashion as do spacers 46, 47, 48, and 49 along the rods represented. The connection of spacers 52 to rod 45 is not represented, since it is the same as their connection to rod 41. It is evident that the spacers are fixed against axial movement with respect to the edge rods 41 and 45 only by the friction produced by the pressure of loops 51 and 53 against the edge rods. This simple fixing means has proven adequate for a number of demonstrations of rolling up and release with self-erection of the structure described, but it is clear that loops 53 might be brazed to the rods without impairing the capacity for mutual hinge action of spacers 52 with respect to spacers 46, 47, 48, and 49 at the edge rods 41 and 45. This would be a desirable precaution for a device intended for extremely long use or rough handling.

The spacers were given a permanent set by simply bending them to arcs of circles before assembly. Thus the spacers 46, 47, 48, and 49, if released from constraints, would tend to elevate rods 41 and 45 toward the viewer away from the plane of the figure, elevating rods 42 and 44 somewhat less, leaving rod 43 in the plane of the paper to form a semicircle. Spacers 52 are similarly given a permanent set, so that the entire structure when released tends to form a circle of parallel rods about three inches in diameter. When constrained to be flat, the structure may readily be rolled onto a spool six inches in diameter. Lengths, of the dimensions described, up to twenty feet have been fabricated and are self-erecting as unrolled, and rigid and stable.

What is claimed is:
1. A self-erecting collapsible structure comprising:
   (a) a plurality of more than three straight rods
      (1) sufficiently flexible to be rolled into a circle without being permanently deformed thereby,
      (2) arranged in a fixed closed cyclical sequence including two edge rods not adjacent to each other in the said sequence, all other rods being intermediate rods;
   (b) a plurality of spacers extending from each rod to the rod next in the sequence,
      (1) each spacer being fastened to the rod from and to the rod to which it extends by fastening means which maintain the spacer fixed in angular position with respect to the axis of each rod to which it is fastened and fixed in position along the axis of each rod to which it is fastened;
   (c) the combination of the spacers extending from any intermediate rod to the rod next preceding it and the rod next succeeding it in the sequence and the fastening means which fasten the spacers to the said intermidate rod comprising
      (1) compliance means which tend to maintain the axis of the said intermediate rod and of the rod next preceding it and of the rod next succeeding it in the sequence non-coplanar, but are elastically yieldable to an applied force to permit the axes of the said three rods to become coplanar;
   (d) the dimensions of the said spacers being such that, when the axis of each intermediate rod is substantially coplanar with the axis of the rods next adjacent to it, the spacers extending from a first edge rod between it and the intermediate rods succeeding it in the sequence as far as and to the second edge rod will collectively separate the said first edge rod from the second edge rod by the same distance as do collectively the spacers extending from second edge rod between it and the intermediate rods succeding it in the sequence as far as and to the first edge rod.

2. The structure claimed in claim 1 in which the spacers have the form of linear elements whose axes form an acute angle with the axes of the rods to which they are fastened.

3. The structure claimed in claim 1 in which the therein recited spacers are elastic to comprise compliance means.

4. The structure claimed in claim 1 in which the therein recited spacers are pivoted to rotate around the axes of the rods to which they are fastened and separate elastic means tend to restrict their rotation.

5. The structure claimed in claim 1 in which the spacers are of different sizes at different altitudes so that the structure is tapered when erected.

6. The structure claimed in claim 1 in which the spaces between different rods at any given altitude of the structure differ so that, when the structure is collapsed to render all the axes of the rods substantially coplanar, the intermidiate rods will lie beside, rather than upon, each other.

References Cited

UNITED STATES PATENTS

| | | | |
|---|---|---|---|
| 1,196,872 | 9/1916 | Lachmann | 52—653 |
| 2,987,148 | 6/1961 | Millard | 52—645 |
| 3,298,142 | 1/1967 | Isaac | 52—108 |
| 3,385,397 | 6/1968 | Robinsky | 52—108 |

FOREIGN PATENTS 10,676  4/1910  Great Britain.

HENRY C. SUTHERLAND, Primary Examiner

U.S. Cl. X.R.

52—645, 653